US008491382B2

(12) United States Patent
Kroon

(10) Patent No.: US 8,491,382 B2
(45) Date of Patent: Jul. 23, 2013

(54) TIME BOMB JACKPOT

(75) Inventor: James Kroon, Macquarie Park (AU)

(73) Assignee: Aristocrat Technologies Australia Pty Limited (AU)

( * ) Notice: Subject to any disclaimer, the term of this patent is extended or adjusted under 35 U.S.C. 154(b) by 104 days.

(21) Appl. No.: 12/894,559

(22) Filed: Sep. 30, 2010

(65) Prior Publication Data

US 2011/0081962 A1 Apr. 7, 2011

(30) Foreign Application Priority Data

Oct. 2, 2009 (AU) ................................ 2009904856

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl.
USPC ............................................................ 463/26

(58) Field of Classification Search
USPC ............................................................ 463/26
See application file for complete search history.

(56) References Cited

U.S. PATENT DOCUMENTS

| | | | |
|---|---|---|---|
| 2004/0235552 | A1 | 11/2004 | Gauselmann |
| 2007/0032286 | A1 | 2/2007 | Muir |
| 2007/0207850 | A1 | 9/2007 | Darrah et al. |
| 2007/0235932 | A1 | 10/2007 | Karwat Singer et al. |
| 2008/0102920 | A1 | 5/2008 | Baerlocher |
| 2008/0254871 | A1 | 10/2008 | Fujimoto et al. |

OTHER PUBLICATIONS

Examiner's First Report and Search Information Statement corresponding to Australian Patent Application No. 2010224372, 5 pages, Jun. 6, 2011.

*Primary Examiner* — William M. Brewster
(74) *Attorney, Agent, or Firm* — McAndrews, Held & Malloy, Ltd.

(57) ABSTRACT

A method for use with a plurality of linked gaming machines, the plurality of linked gaming machines each having a game controller. The method comprises initiating a feature at the end of the play of a game on at least one of the plurality of gaming machines, enabling a bidding sequence during the feature, the bidding sequence ending at a time that is unknown to the players playing at the plurality of the linked gaming machines, enabling at least one of the players playing at the plurality of linked gaming machines to place at least one bid during the bidding sequence, and awarding a feature award to the player who places a highest bid during the bidding sequence.

13 Claims, 5 Drawing Sheets

TIME BOMB JACKPOT

RELATED APPLICATIONS

This application claims priority to Australian Patent Application No. 2009904856, having a filing date of Oct. 2, 2009, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention generally relates to gaming machines and methods of gaming. A particular embodiment of the present invention relates to a method of determining and awarding a bonus award in a linked community game.

With the increase of gambling at gaming venues has come increased competition between gaming venues to obtain a larger share of the total gambling spend. Gaming venue operators have therefore continuously looked for new variations and types of games in order to attract both new and return customers to their venues.

In response to this need, suppliers of gaming devices and systems have attempted to provide the sought after variety, while still developing games that comply with the relevant regulations in the jurisdiction of the gaming venue operator. Suppliers of gaming devices therefore are faced with restrictions on the types of games and gaming machines that are allowable, both in terms of the prevailing regulations and in terms of providing a return on investment to the gaming venue operators.

Under these regulatory and financial considerations, gaming machine suppliers have developed methods of awarding prizes in ways that are entertaining. For example, one category of game play involves community games, where multiple players participate in the same games, and where the players may either compete against each other, or work together against the house (i.e. a gaming venue or venues). One or more players may win a community jackpot or one or more community prizes after a community game. A bonus or feature game may be triggered after the base game play portion of the community game has concluded.

Any reference in this specification to the prior art does not constitute an admission that such prior art was well known or forms part of the common general knowledge in any jurisdiction.

Throughout the specification the term “comprise” and variations on this term including “comprising” and “comprises” are to be understood to imply the inclusion of a feature, integer, step or element, and not to exclude other features, integers, steps or elements.

BRIEF SUMMARY OF THE INVENTION

According to a first aspect, the invention broadly resides in a method for use with a plurality of linked gaming machines, the plurality of linked gaming machines each having a display and a game controller. The method according to this aspect of the invention comprises:

initiating a feature at the end of the play of a game provided by at least one of the plurality of linked gaming machines;

enabling a bidding sequence during the feature, the bidding sequence ending at a time that is unknown to the players playing at the plurality of the linked gaming machines;

enabling at least one of the players playing at the plurality of linked gaming machines to place at least one bid during the bidding sequence; and awarding a feature award to the player who places a highest bid during the bidding sequence.

According to second aspect, the invention broadly resides in a plurality of linked gaming machines, each game machine including a game controller, at least one display and one or more input devices in communication with the game controller, the game controllers of the plurality of linked gaming machines being in communication with a server. The server initiates a feature upon detecting an occurrence of one or more trigger conditions, wherein a bidding sequence is provided during the play of the feature, wherein players playing at the plurality of linked gaming machines may place bids during the bidding sequence, the bidding sequence ending at a time that is unknown to the players. At the end time of the bidding sequence, the player who places a highest bid is awarded a feature award.

Two or more players playing at the linked gaming machines may bid against each other. Alternatively the players work together and bid against a house that provides the feature, wherein the server places one or more house bids in the bidding sequence.

According to third aspect, the invention broadly resides in a gaming machine comprising:

a game controller and a user interface, which cooperate to provide a gaming session comprising play of at least one wagering game;

a credit receiver comprising at least one of a credit input device and a communications interface to a player account management device;

a credit meter that maintains a credit balance during a gaming session;

wherein an available number of bids, points, or units of currency is accumulated during the game session;

the game controller of the machine being in communication with a server, the server causing commencement of a feature at an end of the gaming session, and enabling a bidding sequence during the feature, the bidding sequence ending at a time that is unknown to a player playing at the gaming machine;

wherein the gaming machine enables the player to place a bid using the available number of bids, points, or units of currency during the bidding sequence, and awards the player a feature award if the bid is a highest bid placed in the bidding sequence.

In one embodiment of any of the above aspects, an incrementing current bid value is displayed during the bidding sequence, wherein the bidding sequence ends when the current bid value reaches a hidden ceiling value.

The changing current bid value may be displayed on the displays of the plurality of the linked gaming machines.

The hidden ceiling value may be generated by a random number generator that is located within, or in communication with, the server.

In one embodiment, the value of the feature award is the same as the value of highest bid. The feature award may be a feature jackpot or a feature prize.

In the immediately preceding embodiment, the server calculates a difference between the value of the highest bid and the hidden ceiling value. If the difference is lower than a threshold, the server awards a secondary award to the highest bidder, and then resets the value of the secondary award to a seed value. If the difference is higher than the threshold, the server adds the value of the difference to value of the secondary award. The seed value may be the value of a background pool, the value of the background pool being accumulated from a portion of the difference.

The secondary award may be a secondary jackpot, or alternatively a secondary prize.

In any of the above embodiments, for each participating player the server, or the game controller of the gaming machine at which the participating player plays, accumulates a number of available bids that can be made during the feature, or a number of points or currency units with which bids can be made during the feature. Available bids, points, or units of currency are accumulated when specific outcomes during normal play at the gaming machines are detected. The number of available bids, points, or units of currency accumulated may depend on the specific outcome of the play of the game.

Alternatively, or in addition, the server may accumulate a number of bids, points, or units of currency that is proportional to winnings won during the play of the game.

Alternatively, or in addition, each player may purchase available bids, points, or units of currency that can be used for bidding in the bidding sequence.

According to fourth aspect, the invention broadly resides in instructions executable by a game controller to implement the method as described in the immediately preceding paragraphs and to such instructions when stored in a storage medium readable by the game controller.

Further aspects of the present invention and further embodiments of the aspects described in the preceding paragraphs will become apparent from the following description, given by way of example and with reference to the accompanying drawings.

DETAILED DESCRIPTION OF THE INVENTION

Figure 1:
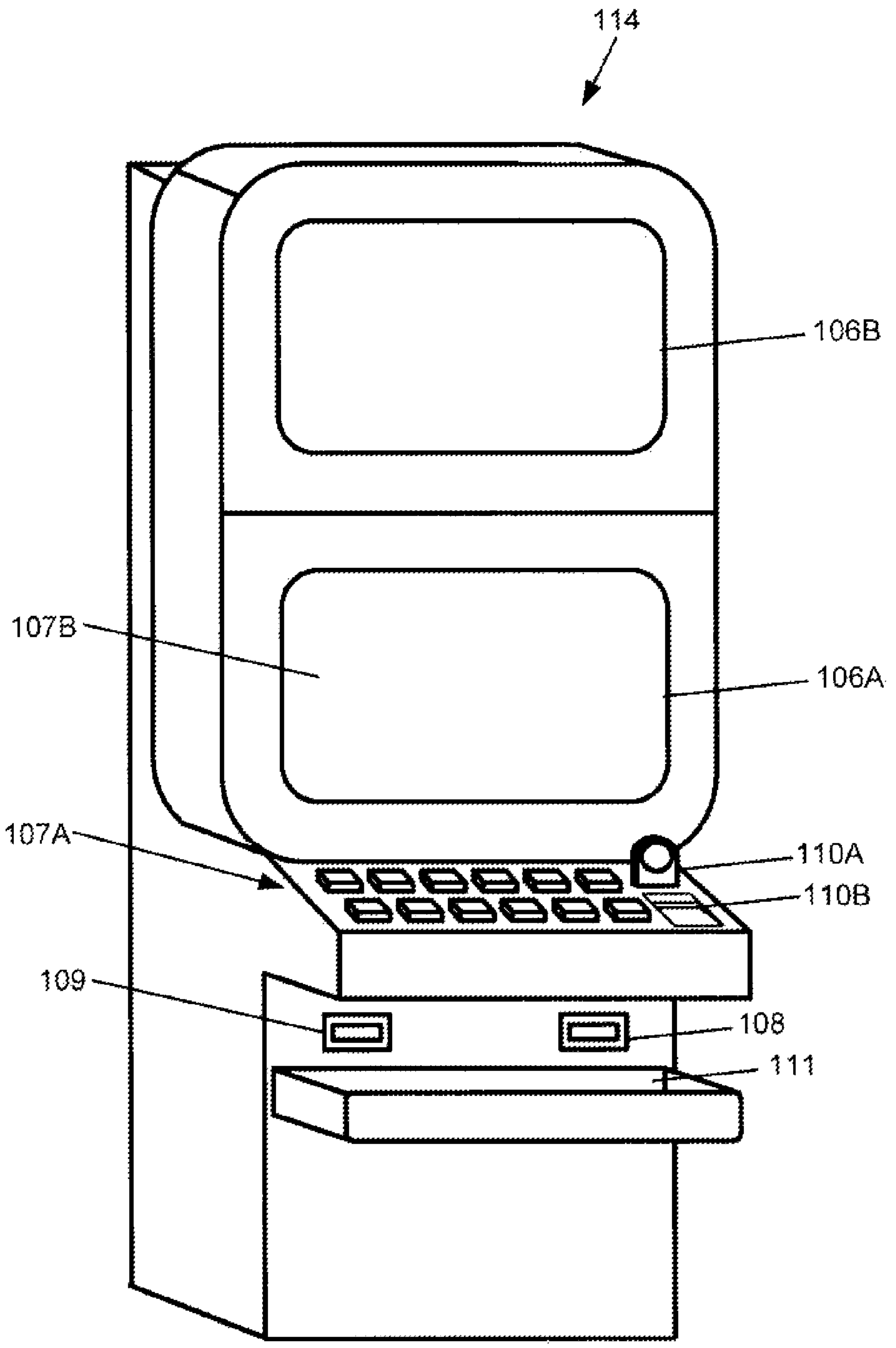
FIG. 1: shows diagrammatically, a view of a gaming console suitable for implementing the present invention.

In FIG. 1 of the accompanying drawings, one example of a gaming console that is suitable to implement the present invention is generally referenced by arrow 114.

The gaming console 114 includes two displays 106A, 106B on one or both of which is displayed representations of a game that can be played by a player and a bank of buttons 107A and/or a touch screen 107B to enable a player to play the game. The displays 106 may be video display units, such as a cathode ray tube screen device, a liquid crystal display, plasma screen, any other suitable video display unit, or the visible portion of an electromechanical device. The display 106B may display artwork, including for example, pay tables and details of bonus awards and other information or images relating to the game. In alternative gaming consoles the display 106B may be omitted, optionally replaced by a static display.

A credit input including a coin input 110A and/or bill collector 110B allows a player to provide credit for wagering and a coin output 111 is provided for cash payouts from the gaming console 114. A card and/or ticket reader 108 and a printer 109 may be provided to provide player tracking, cashless game play or other gaming and non-gaming related functions.

Figure 2:
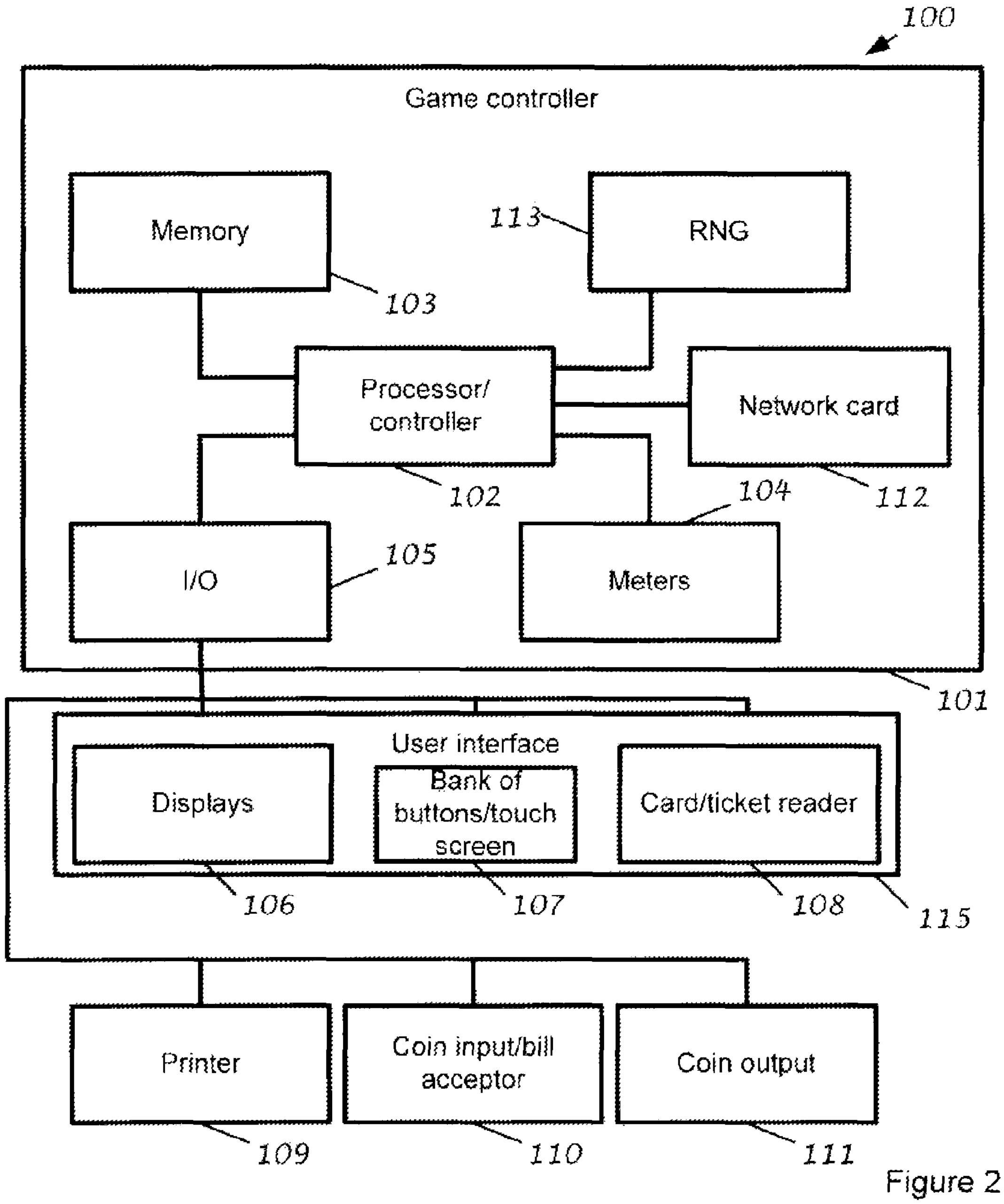
FIG. 2: shows a block diagram of a gaming machine suitable for implementing the present invention.

FIG. 2 shows a block diagram of a gaming machine, generally referenced by arrow 100, suitable for implementing the present invention. The gaming machine 100 may include the gaming console 114 shown in FIG. 1 and accordingly like reference numerals have been used to describe like components in FIGS. 1 and 2.

The gaming machine 100 includes a game controller 101, which in the illustrated example includes a computational device 102, which may be a microprocessor, microcontroller, programmable logic device or other suitable device. Instructions and data to control operation of the computational device 102 are stored in a memory 103, which is in data communication with, or forms part of, the computational device 102. Typically, the gaming machine 100 will include both volatile and non-volatile memory and more than one of each type of memory, with such memories being collectively represented by the memory 103. The instructions to cause the game controller 101 to implement the present invention will be stored in the memory 103. The instructions and data for controlling operation of the computational device 102 may be stored on a computer readable medium from which they are loaded into the gaming machine memory 103. The instructions and data may be conveyed to the gaming machine by means of a data signal in a transmission channel. Examples of such transmission channels include network connections, the Internet or an intranet and wireless communication channels.

The game controller 101 may include hardware credit meters 104 for the purposes of regulatory compliance and also include an input/output (I/O) interface 105 for communicating with the peripheral devices of the gaming machine 100. The input/output interface 105 and/or the peripheral devices may be intelligent devices with their own memory for instructions and data.

In the example shown in FIG. 2, the peripheral devices that communicate with the controller are the displays 106, bank of buttons/touch screen 107, the card and/or ticket reader 108, the printer 109, a bill acceptor and/or coin input 110 and a coin output 111. Additional devices may be included as part of the gaming machine 100, or devices omitted as required for the specific implementation.

The bank of buttons 107A and/or touch screen 107B together with one or both of the displays 106 may provide a user interface 115 through which the gaming machine 100 and player communicate. If a card/ticket reader 108 is provided, this may also form part of the user interface 115.

In addition, the gaming machine 100 may include a communications interface, for example a network card 112. The network card 112, may for example, send status information, accounting information or other information to a central controller, server or database and receive data or commands from the central controller, server or database. The network card 112 may also enable communication with a central player account, allowing cashless gaming. One or more of the peripheral devices, for example the card/ticket reader 108 may be able to communicate directly with the network card 112. The network card 112 and the I/O interface 105 may be suitably implemented as a single machine communications interface.

The game controller 101 may also include a random number generator 113, which generates a series of random numbers that are used by the computational device 102 to determine the outcomes of games played on the gaming machine 100.

The game controller 101 may have distributed hardware and software components that communicate with each other directly or through a network or other communication channel. The game controller 101 may also be located in part or in its entirety remote from the user interface 115. Also, the computational device 102 may comprise a plurality of devices, which may be local or remote from each other. Instructions and data for controlling the operation of the user interface 115 may be conveyed to the user interface 115 by means of a data signal in a transmission channel. The user interface 115 may be a computational device, for example a personal computer, used by a person to play a game provided from a remote game controller 101.

Figure 3:
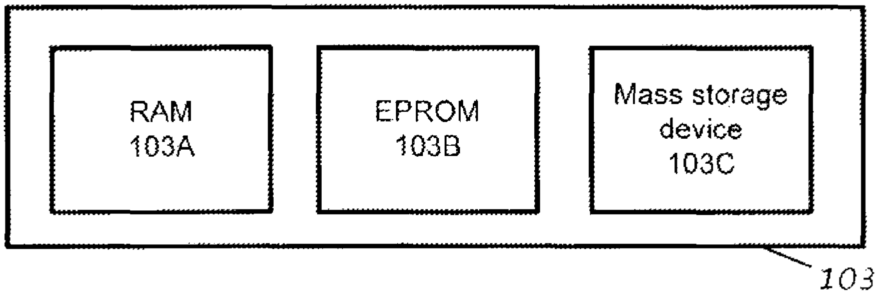
FIG. 3: shows a block diagram of components of the memory of the gaming machine represented in FIG. 2.

FIG. 3 shows an exemplary block diagram of the main components of the memory 103. The RAM 103A typically temporarily holds instructions and data related to the execution of game programs and communication functions performed by the computational controller 102. The EPROM 103B may be a boot ROM device and/or may contain system and game related code. The mass storage device 103C may be used to store game programs, the integrity of which may be verified and/or authenticated by the computational controller 102 using protected code from the EPROM 103B or elsewhere.

Figure 4:
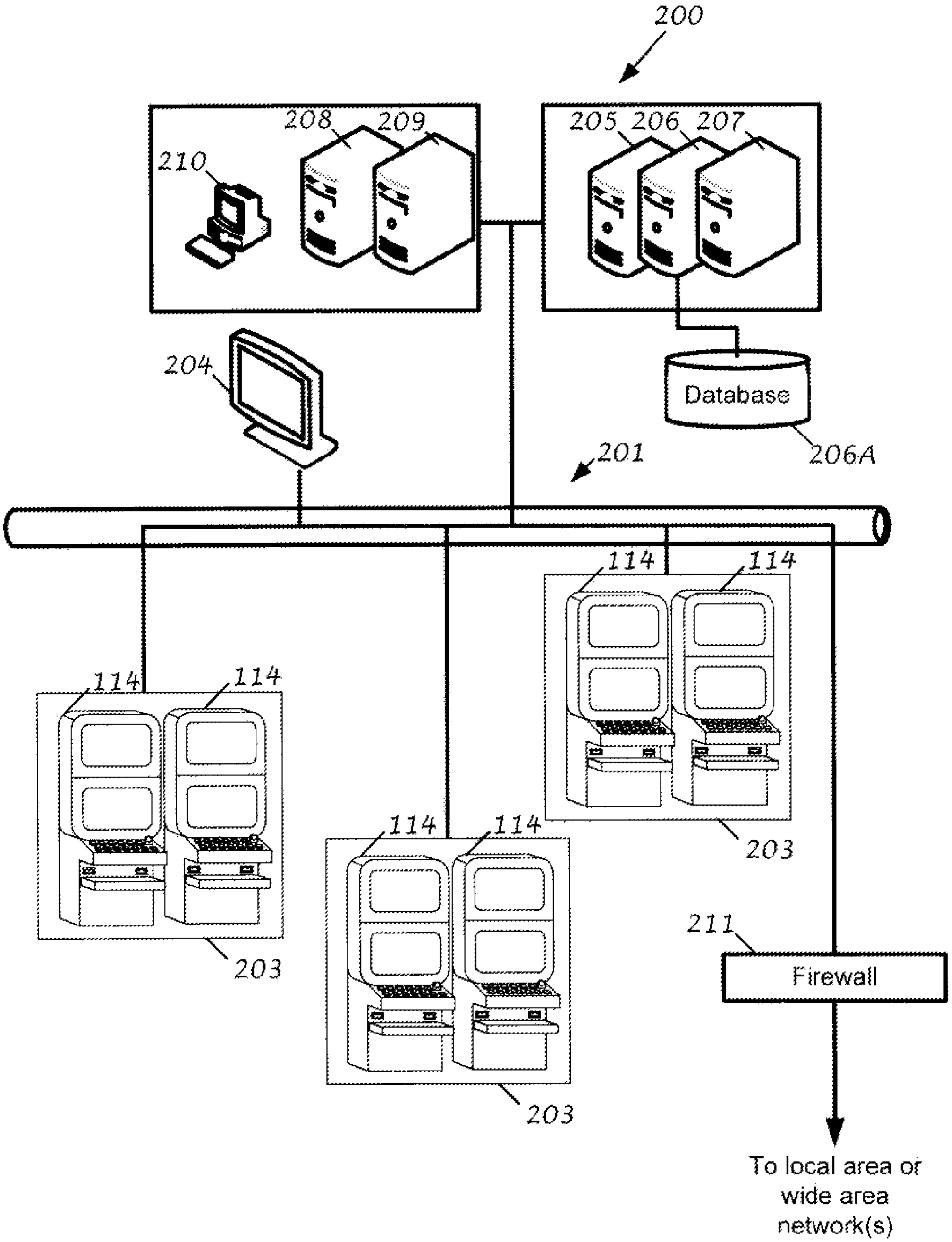
FIG. 4: shows diagrammatically, a network gaming system suitable for implementing the present invention.

FIG. 4 shows a gaming system 200 in the form of a network of devices. The gaming system 200 includes a network infrastructure 201, which for example may be in the form of an Ethernet network. Alternatively, a wireless network and/or direct communication channels, or a different type of network may be used to link the gaming machines to a server, each other and/or other devices. Gaming consoles 114, shown arranged in three banks 203 of two gaming consoles 114 in FIG. 4, are connected to the network infrastructure 201. The gaming consoles 114 may form part or all of a gaming machine 100. Single gaming consoles 114 and banks 203 containing three or more gaming consoles 114 may also be connected to the network infrastructure 201, which may also include bank controllers, hubs, routers, bridges to other networks and other devices (not shown).

One or more displays 204 may also be connected to the network 201. The displays 204 may, for example, be associated with a bank 203 of gaming consoles 114. The displays 204 may be used to display representations associated with game play on the gaming consoles 114, and/or used to display other representations, for example promotional or informational material.

Servers may also be connected to the network 201. For example, a game server 205 may generate game outcomes for games played on one or more of the gaming consoles 114, a database management server 206 may manage the storage of game programs and associated data in a database 206A so that they are available for downloading to, or access by, game controllers 101, and a jackpot server 207 may control one or more jackpots for the gaming system 200.

Further servers may be provided to assist in the administration of the gaming system 200, including for example a gaming floor management server 208, and a licensing server 209 to monitor the use of licenses to particular games. An administrator terminal 210 is provided to allow an administrator to manage the network 201 and the devices connected to the network. The different servers depicted can be distinct physical servers or logically distinct server processes running on a single physical server.

The gaming system 200 may communicate with other gaming systems, other local networks, for example a corporate network and/or a wide area network such as the Internet through a firewall 211.

Figure 5:
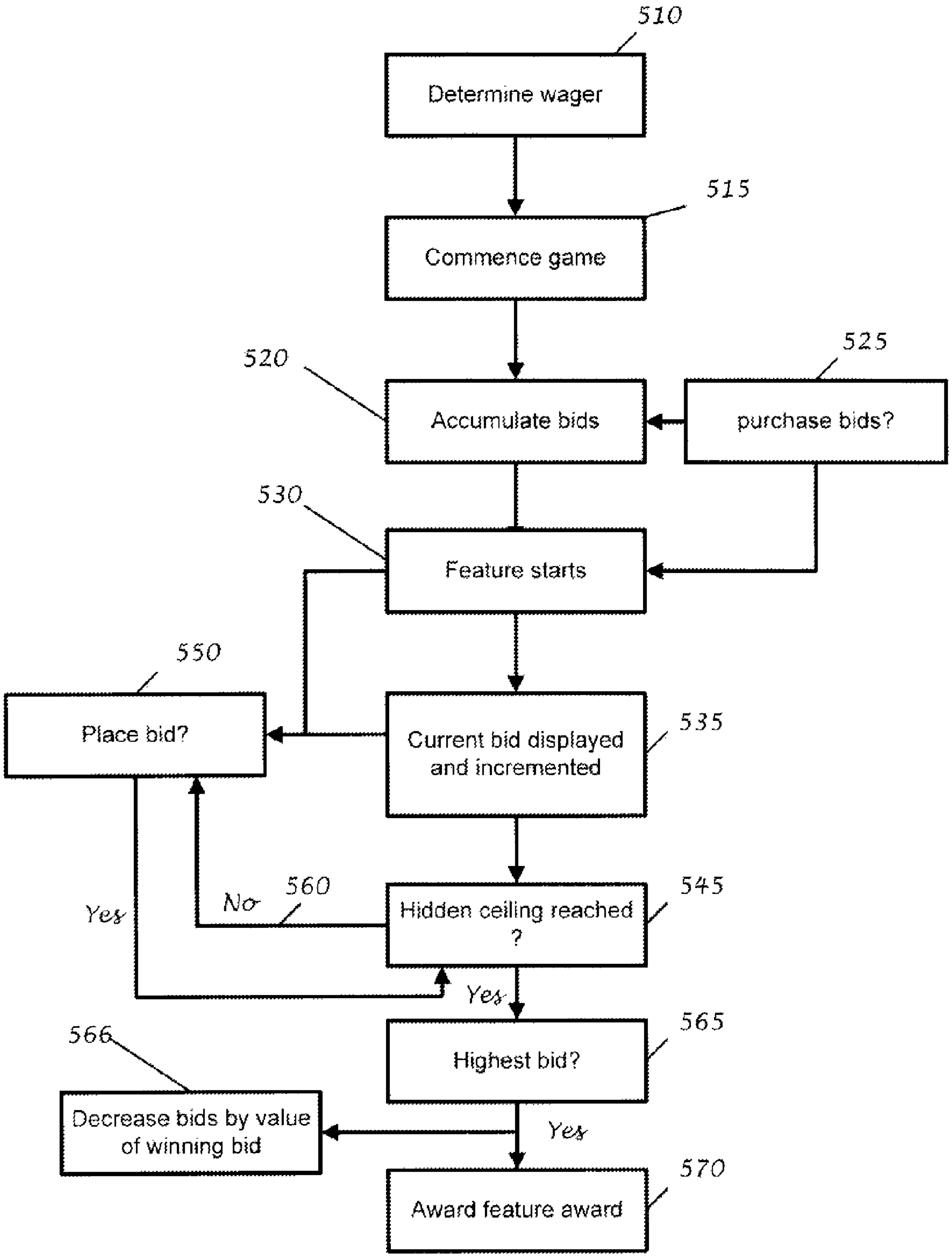
FIG. 5: shows a flow diagram depicting a feature provided in accordance with an embodiment of the present invention.

FIG. 5 shows a process flow diagram of a process performed in accordance with an embodiment of the present invention. The process 500 may be performed by the gaming system 200, in which the gaming consoles 114 each include game controllers 101 to form gaming machines 100 and the following description assumes this implementation. However, those skilled in the relevant arts will appreciate that the process will also be able to be implemented by other gaming systems.

In step 510, the game controller 101 of each of the game consoles linked in the community game monitors the bill acceptor and/or coin input 110 and/or information received by the card/ticket reader 108 or network card 112 for a deposit of credit and in response causes the hardware meters 104 to increment according to the denomination of the game. The game controller 101 then monitors the user interface 107 for the input of a wager.

If there are sufficient credits in the meters 104 to support the wager, including any ante-bet, a game play is commenced in step 515 by the game controller 101. This game play may for example be a game play of a spinning reel game, dice game, card game, or the like, in which symbols are displayed and prizes are awarded for winning combinations. This game is referred to as a base game.

Once the game commences 515, the player will have the opportunity to accumulate bids, points or currencies that may be used in a feature (i.e. bonus game) 520. For example, the game controller 101 monitors the progress (i.e. turnover) or game outcomes for each player, and awards the player a fixed or variable number of available bids or points, or value of game or real currency, each time a certain progress threshold or outcome occurs during the game play. Alternatively, a central controller, such as the jackpot server 207 receives signals from the gaming machines. The central controller may keep a record of the accumulated number of available bids, for use in the feature.

For the purpose of clarity, the bids, points, or currencies, will be collectively referred to as bids in the rest of the specification. The accumulated bids may further be stored or tracked in a bid account (i.e. a bid meter or a bid counter for a player, or for a gaming machine).

Different amounts of bids may be awarded after different outcomes in the base game play. The amount of bids accumulated may be a portion of the winnings won during the game play. A player may further buy or trade bids using cash, his or her existing game points (these are points otherwise redeemable for other purposes), winnings, wagers, or the like (step 525). The bids accumulated by each player may be stored in the bid account, so that they can be used in the feature. A bid meter may further be displayed on the gaming console 114 to show user the player's accumulated bids. In some embodiments, the amount of bids accumulated may further or alternatively be proportional to, or otherwise depend on, the size of a wager placed in the base game. In some examples, the gaming machine controller 101, jackpot server 207, or game server 205 may further award bids randomly, after a wager, ante-bet, or the like has been placed in the base game.

As will be explained, the feature is similar to an auction process, and includes a bidding sequence in which participants bid against each other (or against a gaming house) for a feature award. In the embodiment where the participants bid against the house, the server (205 or 207) may randomly place bids in the bidding sequence. The feature may enable the participants to pool their bids together for use in the bidding sequence, and the participants share the feature award if they win. Alternatively, in cases where there is only one participant in the feature, that participant can bid against the house. If the house wins, the feature award may be accumulated to be won in a future feature.

The feature or bonus game may be started in step 530 in various ways. For instance, in some embodiments of the present invention, a feature may start randomly. In some other embodiments, the start of the feature may be triggered, for example, by specific outcomes in the base game or another game, such as a particular symbol combination.

In the feature, the jackpot server 207 or game server 205 causes a value representing a starting bid to be displayed upon commencing the feature (step 530). The game server 205 may cause each of the linked gaming consoles 114 to present, on the display 106, a numerical display, where a number is displayed to the participating players. The game server 205 or jackpot server 207 could present a numerical display at a location that can be commonly observed by the participants, as well as or instead of displaying the number on the game consoles. The starting bid is incremented or otherwise increased from the initially displayed value (i.e. the starting bid), and the displayed value is continually increased to represent the running current bid (step 535). The feature hence is in some respects similar to an auction process, where each participant may decide whether to place a bid at the current value. It will also be appreciated that some other animation or display may be shown instead of, or in addition to, the running number display, to represent the bidding sequence.

The participants may place bids by, for example, pulling on a handle of the gaming console 114, or pressing a control button from the bank of buttons and/or the touch screen 107. The game controller 101 monitors the bids and communicates any bid entries placed to the server (205 or 207). Information regarding the bid placed, such as the bid value, the identity and location of the bidder, may be stored in a database or a memory location accessible by the server (205 or 207). This database or memory location may store information associated with all of the bids placed, or may store only information associated with the latest (and thus highest) bid at any time.

The current bid keeps being incremented until it reaches a ceiling (i.e. maximum) value in step 545, after which no more bids may be placed. The ceiling value may be a randomly generated number. While the current bid is still running (i.e. before the maximum value is reached), the participants may enter bids against each other (step 550). If a participant chooses not to place any bids, no feature award will be awarded to that participant. If a participant makes a bid, that bid is the highest bid until another (or the same) participant enters another bid at a higher 'current bid' value. A participant that is outbid may in some embodiments place another bid (step 560) provided that the hidden ceiling value has not been reached. In another embodiment, a player can only bid once.

Once the ceiling is reached and bidding process concludes (step 545), the highest bid that has been entered is the winning bid, and the participant who has made the winning bid is the winning player (step 565). The bids in the bid account or bid meter of the winning player will decrease by the same amount or number as the highest bid (step 566). A feature award is then awarded to the winning player in step 570.

In the above described embodiments, the ceiling value is unknown to the participating players. The unknown ceiling adds a layer of uncertainty and hence excitement to the game. It will be appreciated that in these embodiments another method of stopping the bidding sequence may be used, as long as the time at which the bidding sequence ends is unknown to the participating players.

The feature award awarded to the winning player may be a feature jackpot or a predetermined prize or amount of points or currency units. In some embodiments the value of the feature jackpot may be the value of the highest bid, and the award may be cash, game currency, or points which the player can use in future games or features, use to trade or purchase prizes, and/or convert to cash winnings.

In the embodiment that the winner wins the value of the highest bid, the server (205 or 207) further provides a secondary award to account for any unpaid jackpot amounts that arise from differences between the available jackpot amounts (the randomly selected ceiling) and the highest bids. One embodiment of this process is depicted in FIG. 6.

Figure 6:
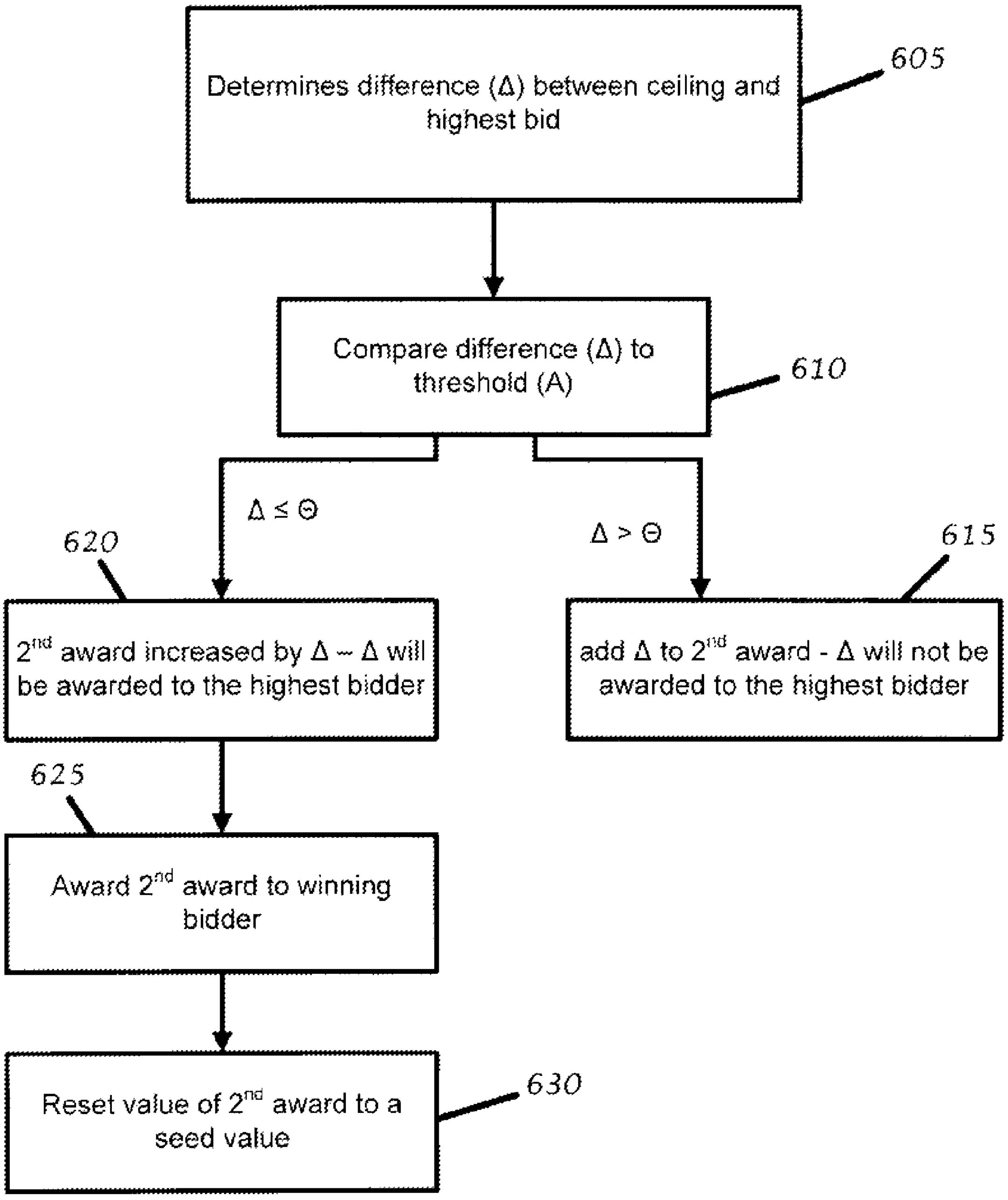
FIG. 6: shows a flow diagram depicting one example of a feature game.

Referring to FIG. 6, the server (205 or 207) calculates a difference between the ceiling value and the highest bid (step 605) and compares this difference (Δ) to a threshold (step 610). If the difference (Δ) is beyond (i.e. higher than) the threshold value (θ), this difference (Δ) is added to the value of a secondary award (step 615). It will be appreciated that the value of this secondary award may thus grow each time a highest bid entered in a feature is not sufficiently close to (i.e. not within the threshold value of) the ceiling value in that feature. However, should a highest bid be entered such that the difference (Δ) is within (i.e. lower than or equal to) the threshold value (θ), the value of the secondary award is increased by the same amount as the difference (Δ) in step 620. In some embodiments the feature might be set up so that the difference (Δ) must be lower than the threshold value (θ) for the secondary award to be awarded. The winning player is awarded the secondary award (step 625), in addition to the feature award. This secondary award may be a secondary jackpot, or a prize of corresponding value. Once the secondary jackpot is awarded, the value of secondary jackpot is reset (step 630) to a seed value, and can be accumulated in the fashion described above. The seed value may be zero. Alternatively, the seed value may be the value of a background pool, where a portion of the difference (Δ) calculated in each feature game is accumulated.

Example 1

The feature has commenced and the 'current bid' at time T is $48.30. The current value of the secondary jackpot is null. Player A places a bid at time T, and no more bids are placed after that. Player A's bid of $48.30 is therefore the highest bid. However the current bid does not stop running until it reaches the hidden ceiling of $60.20. The threshold value is $1.00. Because the difference between the ceiling and the highest bid is $11.90 and is larger than the threshold, the highest bidder receives a feature jackpot value of $48.30. The secondary jackpot is now $11.90.

In a next feature, player B places a winning bid of $67.20, and the ceiling is $68.80. The difference is $1.60 and is still larger than the threshold. Player B is awarded a $67.20 feature jackpot only. $1.60 is added to the secondary jackpot, which now has a value of $13.50.

In a next feature, player C places a winning bid of $56.00 and the hidden ceiling is $56.25. The difference of $0.25 is now smaller than the threshold value. Player C is awarded the feature jackpot of $56.00, and is also awarded the secondary jackpot of $13.75 ($13.50+$0.25).

Further examples are described below. In one embodiment, the accumulated bids are the actual number of bids that a participant can make during the feature. For example, a player who has five available bids can make up to five bids during the feature. In another embodiment, the amount of points or currency that the participant has accumulated is available at his or her disposal to make bids during the feature. For example, a player who has accumulated 50 points may make a bid when the bid value is 5. If the player is outbid then 50 points will still remain, as the bid of 5 points is not successful. The player may make another bid when the bid value is 38 points. If the player is successful, he or she will win the feature award. The remaining 12 points may be returned to the bid counter or bid account, or it may be deleted, depending on the specifics of the embodiment for the feature. However the player will not be able to place bids worth more than 50 points, as the player has not accumulated sufficient points.

While the foregoing description has been provided by way of example of the preferred embodiments of the present invention as presently contemplated, which utilise gaming machines of the type found in casinos, those skilled in the relevant arts will appreciate that the present invention also may have application to internet gaming and/or have application to gaming over a telecommunications network, where handsets are used to display game outcomes and receive player inputs.

Where in the foregoing description reference has been made to integers having known equivalents, then those equivalents are hereby incorporated herein as if individually set forth.

Those skilled in the relevant arts will appreciate that modifications and additions to the embodiments of the present invention may be made without departing from the scope of the present invention.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

The invention claimed is:

1. A method for use with a plurality of linked gaming machines, the method comprising:

initiating a feature on a plurality of the gaming machines;

presenting a bidding sequence during the feature, the bidding sequence ending at a time that is unknown to the players playing at the plurality of the linked gaming machines;

enabling at least one of the players playing at the plurality of linked gaming machines to place at least one bid during the bidding sequence;

awarding a feature award to the player who places a highest bid during the bidding sequence;

calculating a difference between the value of a highest bid and the hidden ceiling value, and wherein if the difference is lower than a threshold, awarding a secondary award to the highest bidder, in addition to the feature award, and resetting the value of the secondary award to a seed value, and if the difference is higher than the threshold, adding the value of the difference to the value of the secondary award.

2. The method of claim 1, wherein the bidding sequence is an increasing current bid value, wherein the method further includes ending the bidding sequence when the current bid value reaches the hidden ceiling value.

3. The method of claim 2, further comprising displaying the current bid value.

4. The method of claim 2, further comprising randomly generating the hidden ceiling value using a random number generator.

5. The method of claim 1, wherein the feature award has a value equal to the value of the highest bid.

6. The method of claim 1, further comprising accumulating bids for the players based on a play of a separate game to the feature.

7. The method of claim 6, wherein the bids are accumulated when specific outcomes in game play of the separate game are detected.

8. The method of claim 6, wherein the number of bids accumulated depends on the specific outcome of game play of the separate game.

9. The method of claim 6, wherein the number of bids accumulated is proportional to a prize won during game play of the separate game.

10. The method of claim 6, wherein each player has the option of purchasing bids that can be used for bidding in the bidding sequence.

11. The method of claim 1, wherein the players bid against each other during the bidding sequence.

12. The method of claim 1, wherein the players bid against a gaming house.

13. The method of claim 1, further comprising executing instructions by a game controller and such instructions are stored in a storage medium readable by the game controller.

* * * * *